Nov. 22, 1955      J. WILSON      2,724,286
DROP STAFF BRAKE MECHANISM
Filed March 9, 1953      4 Sheets-Sheet 1
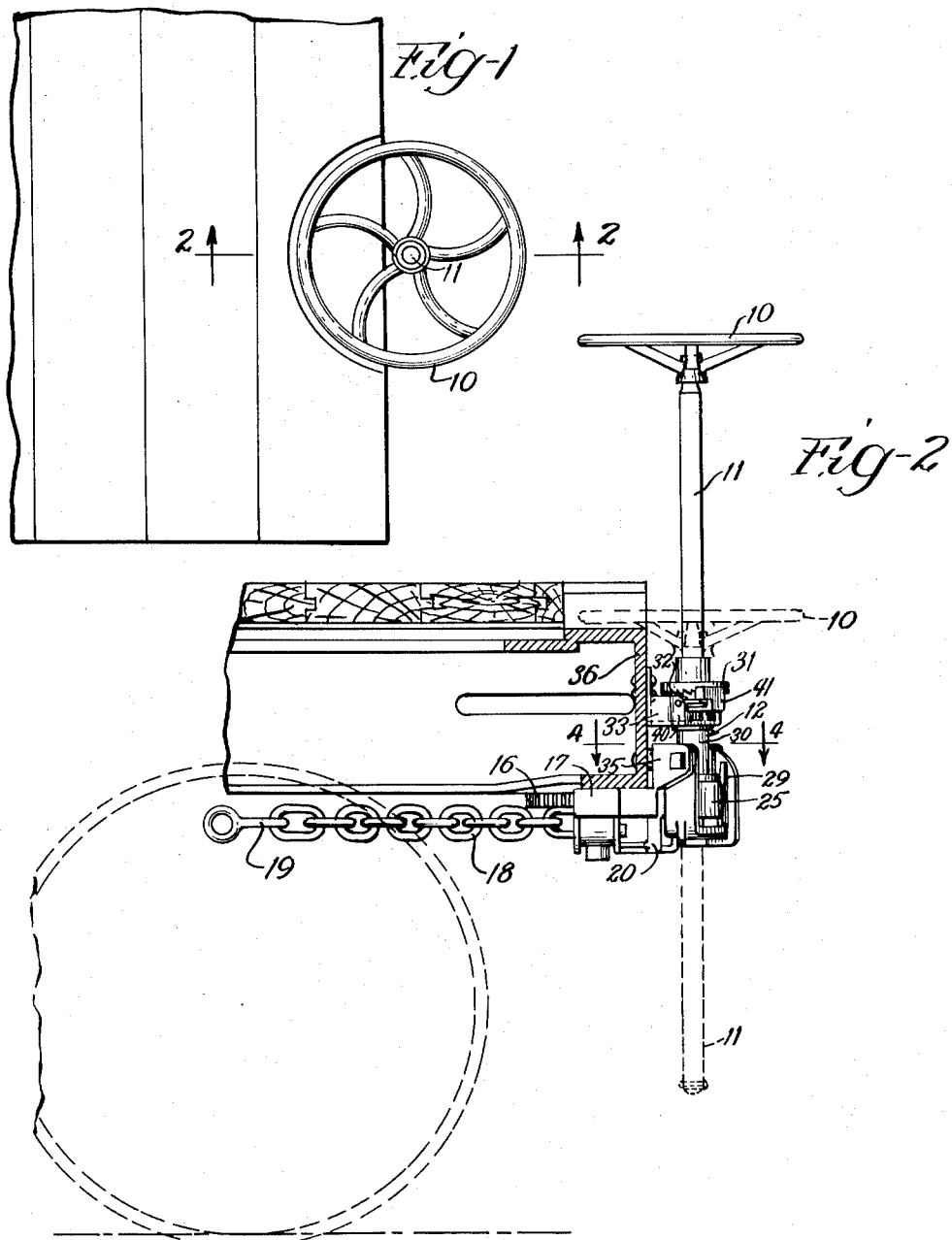
INVENTOR.
Jack Wilson
BY
Mann, Brown, and Hansmann
Attys

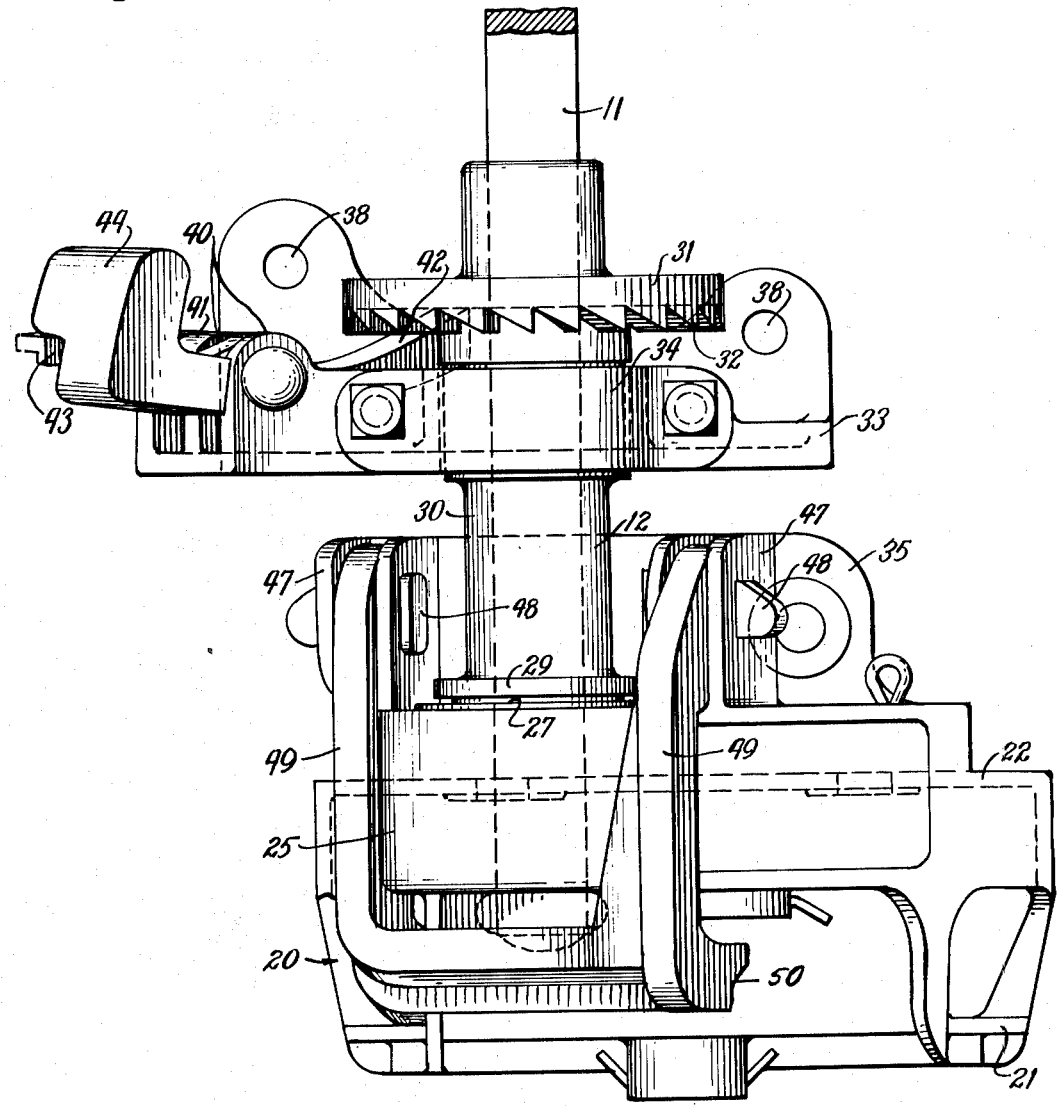

Nov. 22, 1955    J. WILSON    2,724,286
DROP STAFF BRAKE MECHANISM

Filed March 9, 1953    4 Sheets-Sheet 3

INVENTOR.
Jack Wilson
BY
Mann, Brown, and Hansuram
Attys

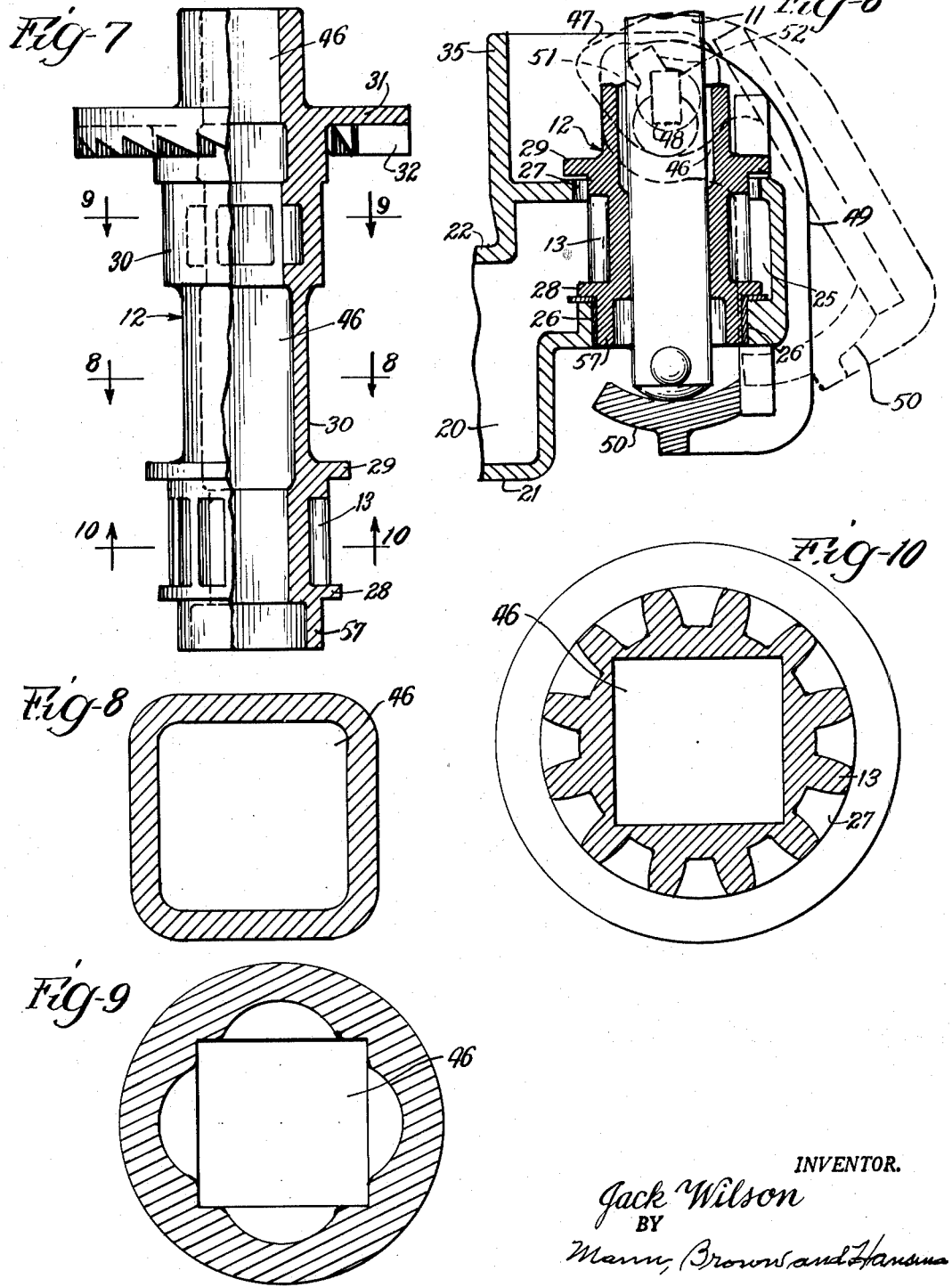

United States Patent Office 2,724,286
Patented Nov. 22, 1955

---

2,724,286

DROP STAFF BRAKE MECHANISM

Jack Wilson, Chicago, Ill., assignor to Universal Railway Devices Co., a corporation of Delaware Application March 9, 1953, Serial No. 341,188

3 Claims. (Cl. 74—510)

This invention relates to hand brakes for railroad flat cars, and has for its principal object to provide a device with the required braking ratio in which the brake staff can be dropped from operating position to an out-of-the-way position clear of the material to be loaded on or unloaded from the floor of the car, whether the brakes are set or released.

Generally speaking, this is accomplished by providing a combined driving pinion and holding ratchet in which the brake staff is mounted to be raised for operation and lowered out of the way of lading.

Further objects and advantages of the invention will appear as the description is read in connection with the drawings, in which Fig. 1 is a plan view of a portion of a flat car with the hand brake applied thereto;

Fig. 2 is a vertical section on the line 2—2 of Fig. 1, the hand wheel and staff being shown in operative position in solid lines and in dropped position in dotted lines;

Fig. 3 is an enlarged front elevation of the mechanism removed from the car;

Fig. 6 is a vertical section on the line 6—6 of Fig. 4;

Figure 4:
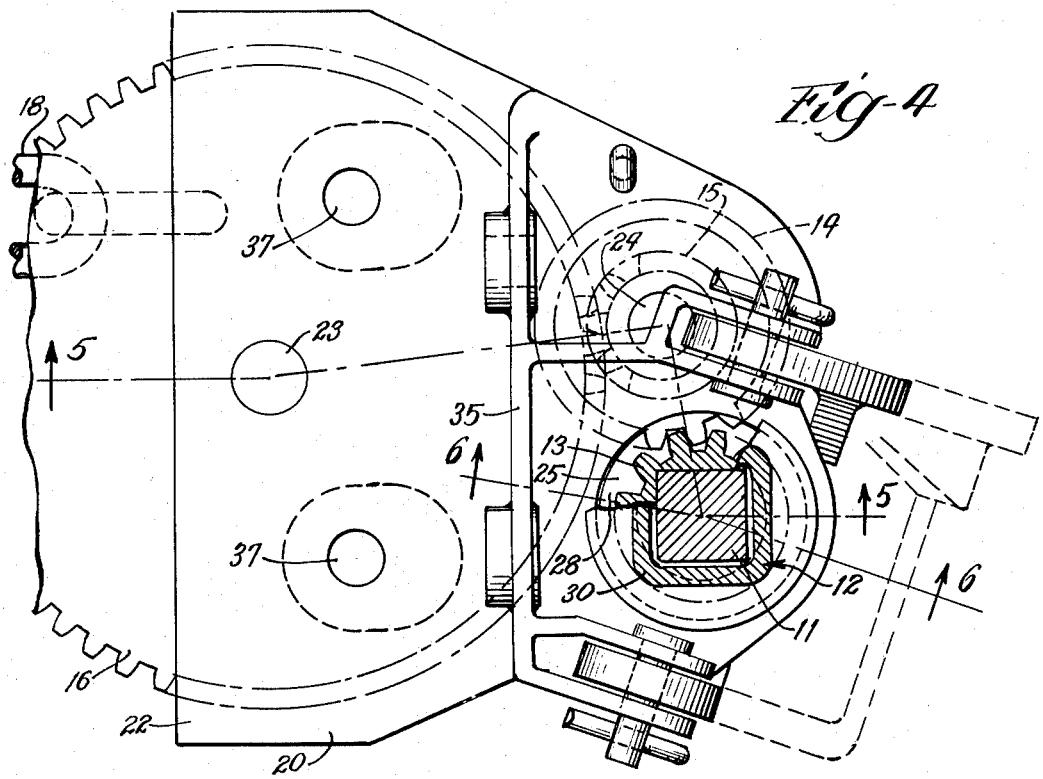
Fig. 4 is a plan view of the mechanism shown in Fig. 3, the holding ratchet and related parts being broken away.

Fig. 7 is a half vertical section through the combined driving pinion and holding ratchet; and Figs. 8, 9, and 10 are horizontal sections on the lines 8—8, 9—9, and 10—10, respectively, of Fig. 7.

But these drawings are for the purpose of illustrative disclosure only, and are not intended to impose unnecessary limitations on the claims.

The hand brake mechanism includes a hand wheel 10 fixed to a drop staff 11, telescoped through a combined driving pinion and holding ratchet generally indicated by 12 including (Fig. 5) a driving pinion 13 meshing with an intermediate gear 14 having a pinion 15 meshing with a main gear 16 on a winding drum 17, to which the draw chain 18 for the hand brake lever is attached by a clevis 19.

The gearing is assembled in a housing generally indicated by 20 including spaced lower and upper portions 21 and 22 between which the main gear 16 and the drum 17 are mounted on a bearing pin 23.

Figure 5:
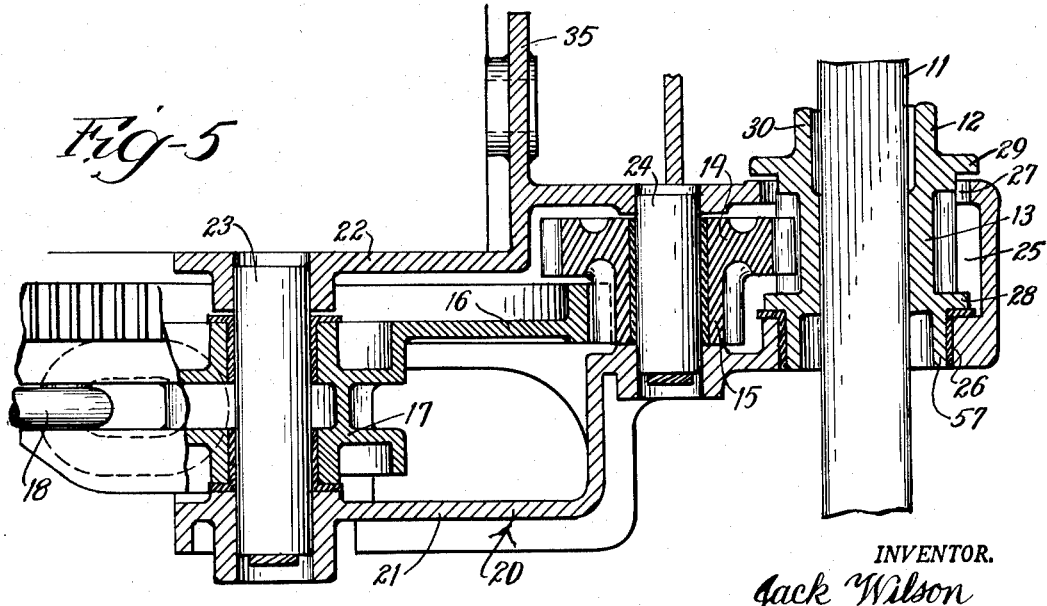
Fig. 5 is a vertical section on the line 5—5 of Fig. 4.

The lower and upper portions 21 and 22 of the housing, offset upwardly as best shown in Fig. 5, receive the intermediate gear 14 journalled on a pin 24. At the right of the intermediate gear in Fig. 5, the lower and upper portions 21 and 22 of the housing provide a receptacle 25 including a lower bearing 26 for the lower end of the combined driving pinion and holding ratchet 12.

The combined driving pinion and holding ratchet has a cylindrical bearing portion 57 adapted to be received in the bearing 26 and a flange 28, which serves as a step or thrust bearing resting on the lower portion 21 of the housing 20.

The offset upper portion 22 of the housing 20 has an opening 27 large enough to permit the flange 28 to pass through it in reaching the position shown in Fig. 5.

Above the driving pinion 13 there is a flange 29 to mask the opening 27 and shield it from dirt falling from above.

Spaced upwardly from the flange 29 (Fig. 7) is an upper bearing portion 30, and above it is an overhanging holding ratchet 31 having ratchet teeth 32 on its lower side.

The bearing portion 30 is journalled between an upper bracket 33 and a cap 34 (Fig. 3).

The housing 20 is provided with an upstanding bracket arm 35 adapted to be secured to the side of an end sill 36, and the upper portion 22 is provided with openings 37 adapted to receive bolts or rivets to secure it to the lower portion of the sill 36.

The bracket 33 has openings 38 to receive fastenings for securing it to the sill above the housing 20.

The bracket 33 is provided with spaced lugs 40, between two of which a holding pawl 41 is pivoted with its curved end 42 in position to engage the teeth 32 of the holding ratchet.

The opposite end 43 of the pawl is in the path of a pawl weight 44 pivoted between two of the lugs 40 and adapted to be in the position shown in Figs. 2 and 3 when the pawl is to engage the ratchet, and to be swung to an inoperative position when the pawl is to be disengaged.

The brake staff 11 is polygonal or out-of-round in cross section, and the combined driving pinion and holding ratchet has a longitudinal passageway 46 (Figs. 7, 8, 9, 10), in which the brake staff is telescoped and adapted to move up and down from operative to drop position, and vice versa.

The offset upper portion 22 of the housing 20 is provided with a pair of U-shaped lugs 47 having bearing pins 48 on which the arms 49 of a stirrup 50 are pivoted to swing from the solid line position shown in Fig 6 beneath the lower end of the raised staff to the dotted line position shown in that figure, and vice versa.

The arms 49 are provided with round bearing openings 51 having lateral slots 52 to receive the oblong bearing pins 48, and thus hold the stirrup in the raised, dotted line position shown in Fig. 6 and out of contact with the staff when it is in the dropped position shown in dotted lines in Fig. 2.

The assembly shown in Fig. 3 makes a commercial unit adapted to be applied to the end sill of a flat car by inserting bolts or rivets through the upper portion 22 of the housing and the bracket 35.

The housing 20 with its stepped upper and lower portions provides a sturdy and practical assembly for the gearing.

The combined driving pinion and holding ratchet with the telescoped brake staff makes it possible to lower or drop the staff whether the brakes are set or released by the simple act of swinging the stirrup 50 from the solid line position shown in Fig. 6 to the dotted line position.

The ratchet, being functionally integral with the driving pinion, serves to maintain the correct relation independent of the position of the brake staff.

When the brakes are set with the pawl 41 engaging the ratchet teeth 32, the staff may be dropped to out-of-the-way position until the brakes are to be released, when it may be raised and made fast by the stirrup 50.

I claim:

1. In a hand brake for railway flat cars, a combined driving pinion and holding ratchet comprising a tubular body open at both ends to receive a hand brake staff with freedom to be raised and lowered through it and including a lower bearing portion, a driving pinion above and separated from the lower bearing portion, and upper bearing portion above the driving pinion and the holding ratchet above and overhanging the upper bearing portion, and bracket means adapted to be fastened to a flat car and in which the upper and lower bearing portions are journalled.

2. In a hand brake for railway flat cars, a combined driving pinion and holding ratchet having an axial opening to receive a hand brake staff with freedom to be raised and lowered through it and including a lower bearing portion, a driving pinion above and separated from the lower bearing portion, an upper bearing portion above the driving pinion and the holding ratchet above and overhanging the upper bearing portion, and bracket means adapted to be fastened to a flat car and in which the upper and lower bearing portions are journalled and including a stepped gear housing, and gears in said housing including an intermediate gear meshing with the driving pinion and a main gear for a chain drum.

3. In a hand brake for railway flat cars, a combined driving pinion and holding ratchet comprising a tubular body open at both ends to receive a hand brake staff with freedom to be raised and lowered through it and including a journal portion at its lower end, a driving pinion between axially spaced radial flanges above said journal portion, and an upper journal portion surmounted by the holding ratchet with a radial shoulder between them spaced above the uppermost of said radial flanges, in combination with bracket means adapted to be fastened to a flat car comprising a lower housing having a bearing mounting the lower end journal portion with the lower of said radial flanges resting on said bearing and comprising also an upper bracket having a bearing mounting the upper journal portion with said radial shoulder resting on said upper bracket bearing.

References Cited in the file of this patent
UNITED STATES PATENTS

| | | |
|---|---|---|
| 983,041 | Gierding | Jan. 31, 1911 |
| 1,174,768 | Shaver | Mar. 7, 1916 |
| 1,244,764 | Neumayer | Oct. 30, 1916 |
| 2,371,326 | Wilson | Mar. 13, 1945 |